US012724306B2

(12) United States Patent
Yin et al.

(10) Patent No.: US 12,724,306 B2
(45) Date of Patent: Sep. 1, 2026

(54) OPTICAL DISPLAY SYSTEM AND ELECTRONICS APPARATUS

(71) Applicants: University of Central Florida Research Foundation, Inc., Orlando, FL (US); Goertek Inc., Weifang (CN)

(72) Inventors: Kun Yin, Oviedo, FL (US); Ziqian He, Oviedo, FL (US); Shin-Tson Wu, Orlando, FL (US); Kun Li, Santa Clara, CA (US)

(73) Assignees: University of Central Florida Research Foundation, Inc., Orlando, FL (US); Goertek Inc., Weifang (CN)

( * ) Notice: Subject to any disclaimer, the term of this patent is extended or adjusted under 35 U.S.C. 154(b) by 378 days.

(21) Appl. No.: 18/276,177

(22) PCT Filed: Feb. 8, 2022

(86) PCT No.: PCT/CN2022/075504

§ 371 (c)(1),
(2) Date: Aug. 7, 2023

(87) PCT Pub. No.: WO2022/166984

PCT Pub. Date: Aug. 11, 2022

(65) Prior Publication Data

US 2024/0111168 A1 Apr. 4, 2024

Related U.S. Application Data

(60) Provisional application No. 63/146,792, filed on Feb. 8, 2021.

(51) Int. Cl.

| | |
|---|---|
| ***G02F 1/1335*** | (2006.01) |
| ***G02B 27/01*** | (2006.01) |
| ***G02B 27/28*** | (2006.01) |

(52) U.S. Cl.
CPC ... *G02F 1/133536* (2013.01); *G02B 27/0172* (2013.01); *G02B 27/283* (2013.01); *G02B 2027/0178* (2013.01); *G02F 2201/343* (2013.01)

(58) Field of Classification Search
CPC ......... G02F 1/133536; G02F 2201/343; G02B 27/0172; G02B 27/283; G02B 2027/0178
See application file for complete search history.

(56) References Cited

U.S. PATENT DOCUMENTS

| | | | | |
|---|---|---|---|---|
| 10,551,622 B2 * | 2/2020 | Robbins | ............... | H04N 13/344 |
| 11,874,474 B1 * | 1/2024 | Lee | .................... | G02B 27/0179 |

(Continued)

FOREIGN PATENT DOCUMENTS

| | | |
|---|---|---|
| CN | 208384241 U | 1/2019 |

*Primary Examiner* — Nathanael R Briggs
(74) *Attorney, Agent, or Firm* — Baker Botts, L.L.P.

(57) ABSTRACT

An optical display system and an electronics apparatus are disclosed. The optical display system comprises: an image source, which generates image light; and an optical combiner, which includes two reflection-type polarization volume lenses working in a Bragg regime, wherein a first reflection-type polarization volume lens of the two reflection-type polarization volume lenses diffracts the image light of a first polarization to a first image and transmits the image light of a second polarization, and a second reflection-type polarization volume lens of the two reflection-type polarization volume lenses diffracts the image light of a third polarization to a second image and transmits the image light of a fourth polarization, the optical combiner outputs the first image and/or the second image as an combined image.

9 Claims, 10 Drawing Sheets

(56) References Cited

U.S. PATENT DOCUMENTS

2009/0168174 A1 7/2009 Kim et al.
2021/0018760 A1 1/2021 Wang et al.
2021/0223549 A1* 7/2021 Maimone ............. G02B 17/004

* cited by examiner

OPTICAL DISPLAY SYSTEM AND ELECTRONICS APPARATUS

CROSS-REFERENCE TO RELATED APPLICATIONS

This application is a National Stage of International Application No. PCT/CN2022/075504, filed on Feb. 8, 2022, which claims priority to U.S. Application No. 63/146,792, filed Feb. 8, 2021, both of which are hereby incorporated by reference in their entireties.

FIELD OF THE INVENTION

This disclosure relates to augmented reality optical system, and more specifically, to an optical display system and an electronics apparatus.

BACKGROUND OF THE INVENTION

Augmented reality (AR) device has a see-through imaging system to overlap the computer generated (CG) images with the surrounding environment, and can support sounds and other feelings to establish a connection between the virtual contents and real world.

AR displays utilize combining optics to magnify and project CG images to viewable size and distance. The content presented to the eye box should have sufficient ambient contrast ratio, field of view (FOV), depth of field (DOF), eye box, image quality, and compact form factor to meet the needs of the viewer's overall experience. A spatial area occupied by the viewer's eyes is commonly referred to as the eye box. Therefore, the contents shall be correctly displayed in see through system with polarizing optical elements. Otherwise, it may induce stray light, ghost images, and sever aberrations, thereby reducing image quality.

In conventional glasses-like configurations, the combiner assembly of an AR display includes an image source and an optical combiner. The CG contents are generated by the image source and then be delivered into viewer's eye with the combiner. Depending on different imaging types, the image sources may include but not limited to a conventional 2D display such as micro-LED LED display, liquid crystal on silicon (LCOS) and a digital micro-mirror device (DMD), or a 3D image source such as a digital holographic display using a spatial light modulator (SLM) and laser light source. To keep a compact form factor, the optical combiner with lens power may deliver the images under off axis incidence, which can be achieved by the holographic optical elements (HOEs). However, the FOV of these configurations is not sufficient due to the tradeoff between the optical aberrations and the f number. When the f number is reduced to provide larger FOV, the optical aberrations will be severe, making the image quality unacceptable.

Besides, the eye box and the DOF are limited. For the eye box issue, when the eye rotates outside the eye box, the image will disappear and the viewer cannot observe the virtual contents. For the limited DOF issue, when the eye is focusing on the presented image instead of the surrounding environment, the real world will be blur except for the surroundings that have the same DOF as the images.

SUMMARY OF THE INVENTION

This invention is to provide new technical solutions with multiplexing method for AR optical display system.

According to a first aspect, there is provided an optical display system, comprising: an image source, which generates image light; and an optical combiner, which includes two reflection-type polarization volume lenses working in a Bragg regime, wherein a first reflection-type polarization volume lens of the two reflection-type polarization volume lenses diffracts the image light of a first polarization to a first image and transmits the image light of a second polarization, and a second reflection-type polarization volume lens of the two reflection-type polarization volume lenses diffracts the image light of a third polarization to a second image and transmits the image light of a fourth polarization, the optical combiner outputs the first image and/or the second image as an combined image.

According to a second aspect, there is provided an electronics apparatus, including the optical display system according to an embodiment.

In various embodiments, a performance of the optical display system can be improved.

Further features of the present invention and advantages thereof will become apparent from the following detailed description of exemplary embodiments according to the present invention with reference to the attached drawings.

BRIEF DESCRIPTION OF THE DRAWINGS

The accompanying drawings, which are incorporated in and constitute a part of the specification, illustrate embodiments of the invention and, together with the description thereof, serve to explain the principles of the invention.

The accompanying drawings, which are incorporated in and constitute a part of the specification, illustrate embodiments of the invention and, together with the description thereof, serve to explain the principles of the invention.

DETAILED DESCRIPTION OF THE EMBODIMENTS

Figure 1:
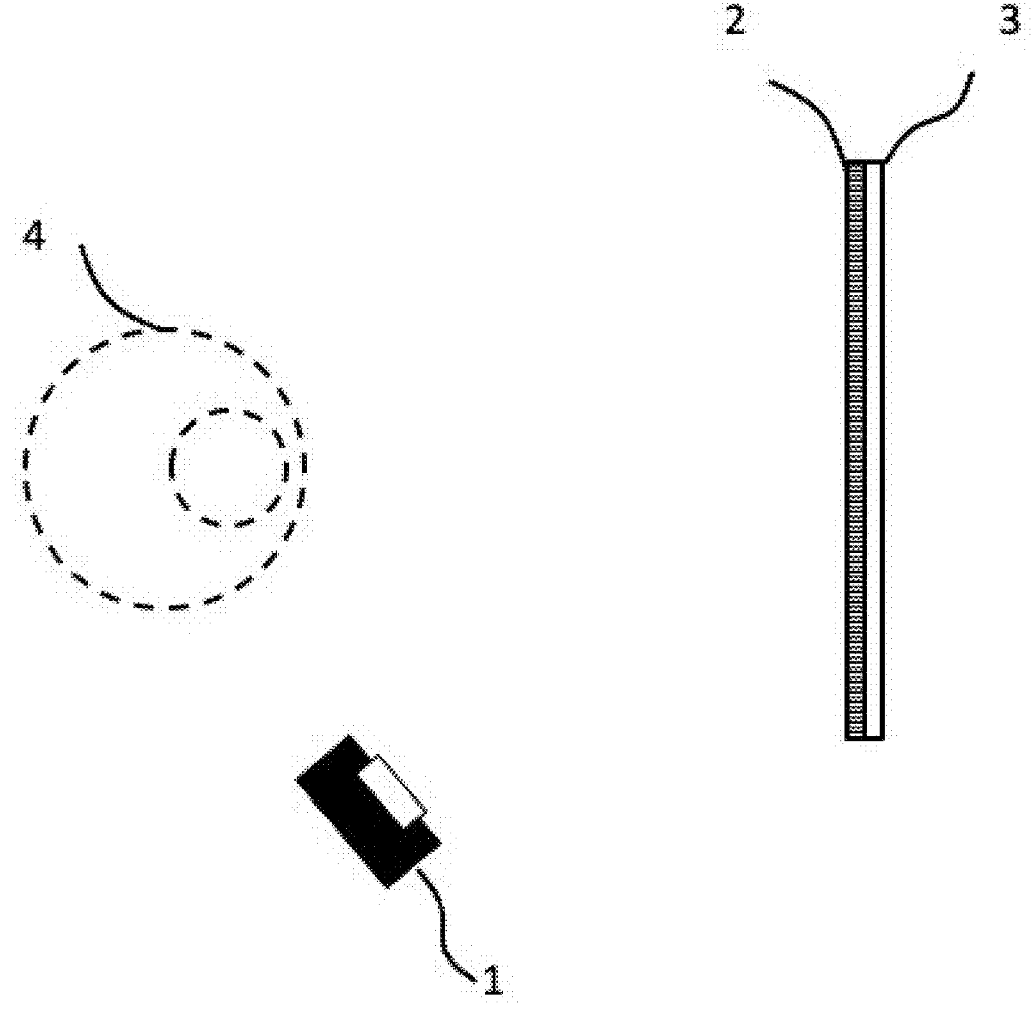
FIG. 1 is a schematic diagram of an optical display system with a combiner consisting of a polarization volume lens or an array of pinhole sized polarization volume lenses.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

In various embodiments, and optical display system, comprising: an image source, which generates image light; and an optical combiner, which includes two reflection-type polarization volume lenses working in a Bragg regime, wherein a first reflection-type polarization volume lens of the two reflection-type polarization volume lenses diffracts the image light of a first polarization to a first image and transmits the image light of a second polarization, and a second reflection-type polarization volume lens of the two reflection-type polarization volume lenses diffracts the image light of a third polarization to a second image and transmits the image light of a fourth polarization, the optical combiner outputs the first image and/or the second image as an combined image. For example, the image light is off axis incident light.

Here, by using the two reflection-type polarization volume lenses working in a Bragg regime, the optical display system can improve a performance of the system based on polarization. For example, through different diffractions by different polarization volume lenses, the combined image can be delivered to different positions to follow the movement of a viewer's eye. Alternatively or optionally, through different diffractions by different polarization volume lenses, for example, two or more sub-images can be combined into one image to enhance the performance such as FOV, resolution and so on.

It shall be understood by a person skilled in the art that although the two reflection-type polarization volume lenses, i.e. the first and second reflection-type polarization volume lenses, are mentioned here, the optical combiner is not limited to these two reflection-type polarization volume lenses and can include further reflection-type polarization volume lenses.

For example, the first polarization is orthogonal to the second polarization and is the same as or orthogonal to the third polarization, and the third polarization is orthogonal to the fourth polarization. In one embodiment, the first polarization and the third polarization are the same, and the second polarization and the fourth polarization are the same. In another embodiment, the first polarization and the fourth polarization are the same, and the second polarization and the third polarization are the same.

For example, the reflection-type polarization volume lenses are pinhole sized polarization volume lenses.

In an embodiment, the optical display system may further comprises: a first polarization modulator, placed between the image source and the optical combiner, wherein the first polarization modulator changes the polarization states of the image light to be suitable for being diffracted by the first reflection-type polarization volume lens and the second reflection-type polarization volume lens, respectively, to form the first image and the second image.

For example, the first polarization modulator changes the polarization states in time-domain or/and pixilation.

In an embodiment, the optical combiner includes N overlapped units, where $N \geq 2$, each of the N overlapped units includes an active half-wave plate and a reflection-type polarization volume lens. The active half-wave plate in each unit is able to be switched between on and off states to make the corresponding reflection-type polarization volume lens diffract the image light of corresponding polarization to a respective image. The respective images diffracted by the reflection-type polarization volume lenses of the N overlapped units are combined into the combined image. The reflection-type polarization volume lenses of the N overlapped units include the a first unit of the two overlapped units includes said first reflection-type polarization volume lens and said second reflection-type polarization volume lens.

In an example, the first reflection-type polarization volume lens and the second reflection-type polarization volume lens are placed in a same plane.

For example, the first image and the second image have different incident angles and/or different diffraction angles and/or different lens powers to follow a movement of a viewer's eye.

In various embodiments, an optical display system is provided, comprising: a display, which generating image light; an optical combiner, which diffracting the image light with specific polarization and generating virtual image under off axis incidence. The combiner is a reflection-type polarization volume lens (PVL), which is based on patterned cholesteric liquid crystal (CLC).

In various embodiments an optical display system is provided, comprising: a display, which generating image light; an optical combiner, which diffracting the image light with specific polarization and generating virtual image under off axis incidence. The combiner is an array of pinhole sized reflection-type PVLs. By applying the pinhole sized combiner, the depth of the field of the virtual image can be dramatically increased.

In various embodiments, a polarization multiplexing optical display system is provided, comprising: a display, which generating image light; an optical combiner, which diffracting the image light with two orthogonal polarizations, generating two virtual images under different off axis incidences, and combining the two virtual images together; a first polarization modulator, which pixelated or time-domain changing the polarization of the image light before encounters the combiner. The combiner is consisting of two reflection-type PVLs with different incident angles, diffraction angles and lens power. The first polarization modulator is consisting of a twisted nematic (TN) or a vertical alignment (VA) cell and a quarter-wave plate. By applying two polarization volume lenses with opposite polarization states, the combined image can obtain enlarged field of field compared with single lens with same parameters.

In various embodiments, a polarization multiplexing optical display system is provided, comprising: a display, which generating image light; an optical combiner, which diffracting the image light with two orthogonal polarizations, generating two virtual images under different off axis incidences, and combining the two virtual images together; a first polarization modulator, which pixelated or time-domain changing the polarization of the image light before encounters the combiner. The combiner is consisting of two arrays of pinhole sized reflection-type PVLs with designed incident angles, diffraction angles and lens power. The first polarization modulator is consisting of a TN or a VA cell and a quarter-wave plate. By applying pinhole sized polarization volume lenses with opposite polarization states, both the field of view and depth of field can be enlarged.

In various embodiments, a polarization multiplexing optical display system is provided, comprising: a display, which generating image light; an optical combiner, which diffracting the image light with two orthogonal polarizations, generating two virtual images under different off axis incidences, and combining the two virtual images together; a first polarization modulator, which pixelated or time-domain changing the polarization of the image light before encounters the combiner. The combiner is consisting of two overlapped reflection-type PVLs with same incident angles and lens power but different diffraction angles. The first polarization modulator is consisting of a TN or a VA cell and a quarter-wave plate. By applying two polarization volume lenses with opposite polarization states, the combined image can obtain enlarged field of field compared with single lens with same parameters.

In various embodiments, an optical display system is provided, comprising: a display, which generating image light; an optical combiner, which diffracting the image light with two orthogonal polarizations, generating two virtual images under different off axis incidences, and combining the two virtual images together; a first polarization modulator, which pixelated or time-domain changing the polarization of the image light before encounters the combiner. The combiner is consisting of two overlapped arrays of pinhole sized reflection-type PVLs with designed incident angles, lens power, and diffraction angles. The polarization modulator is consisting of a TN or a VA cell and a quarter-wave plate. By applying pinhole sized polarization volume lenses with opposite polarization states, both the field of view and depth of field can be enlarged.

In various embodiments, a polarization multiplexing optical display system is provided, comprising: a display, which generating image light; an optical combiner, which diffracting the image light with one polarization, but generating N virtual images under different off axis incidences, and combining the N virtual images together; a first polarization modulator, which provides the polarization of the image light before encounters the combiner. The combiner is consisting of N units. Each unit is composed of a reflection-type PVL and an active half-wave plate. The first polarization modulator can be a quarter-wave plate. By switching the half-wave plate between on and off states in time domain, the corresponding polarization volume lens will work, and then the N images can be combined to enlarge field of field.

In various embodiments, a polarization multiplexing optical display system is provided, comprising: a display, which generating image light; an optical combiner, which diffracting the image light with one polarization, but generating N virtual images under different off axis incidences, and combining the N virtual images together; a first polarization modulator, which provides the polarization of the image light before encounters the combiner. The combiner is consisting of N units. Each unit is composed of an arrays of pinhole sized reflection-type PVLs and active half-wave plates. The first polarization modulator can be a quarter-wave plate. By switching the half-wave plate between on and off states in time domain, the corresponding polarization volume lens will work, and then the N images can be combined to enlarge field of field and depth of field.

In various embodiments, an optical display system comprises: an image source, which generating image light; an optical combiner, which is a reflection-type polarization volume lens. The reflection-type polarization volume lens works in the Bragg regime, and diffracts and images the contents from the image source of the one polarization and transmits the image light of the other orthogonal polarization. Optionally or alternatively, an optical display system may comprise: an optical combiner, which is an array of pinhole sized reflection-type polarization volume lenses. The reflection-type polarization volume lenses work in the Bragg regime, and diffract and image the contents from the image source of the one polarization and transmits the image light of the other orthogonal polarization.

In various embodiments, a polarization multiplexing optical display system comprises: an image source, which generating image light; an optical combiner, which is two reflection-type polarization volume lenses. The two reflection-type polarization volume lenses work in the Bragg regime, and diffract and image the contents from the image source with two orthogonal polarizations respectively. Optionally or alternatively, a polarization multiplexing optical display system may comprise: an optical combiner, which is two arrays of pinhole sized reflection-type polarization volume lenses. The two arrays of reflection-type polarization volume lenses work in the Bragg regime, and diffract and image the contents from the image source with two orthogonal polarizations respectively; and a first polarization modulator, which is a combination of an electronically controlled twisted nematic (TN) or a vertical alignment (VA) cell and a quarter-wave plate. The TN or VA cell can change the polarization state of the image in time-domain or/and pixilation.

In various embodiments, a polarization multiplexing optical display system comprises: an image source, which generating image light; an optical combiner, which is two overlapped reflection-type polarization volume lenses. The two overlapped reflection-type polarization volume lenses work in the Bragg regime, and diffract and image the contents from the image source with two orthogonal polarizations respectively. Optionally or alternatively, a polarization multiplexing optical display system may comprise: an optical combiner, which is two overlapped arrays of pinhole sized reflection-type polarization volume lenses. The two overlapped arrays of reflection-type polarization volume lenses work in the Bragg regime, and diffract and image the contents from the image source with two orthogonal polarizations respectively; a first polarization modulator as described above.

In various embodiments, a polarization multiplexing optical display system comprises: an image source, which generating image light; an optical combiner, which is N overlapped units. Each unit is composed of a reflection-type polarization volume lens and an active half-wave plate. The N overlapped reflection-type polarization volume lenses work in the Bragg regime, and diffract and image the contents from the image source. All the active half-wave plate can be switched between on and off states. Optionally or alternatively, a polarization multiplexing optical display system may comprise: an optical combiner, N overlapped units. Each unit is composed of arrays of pinhole sized reflection-type polarization volume lenses and active half-wave plates. The N overlapped reflection-type polarization volume lenses work in the Bragg regime, and diffract and image the contents from the image source. All the active half-wave plate can be switched between on and off states; and a first polarization modulator, which is a quarter-wave plate.

In an embodiment, the type of the display can be a conventional 2D display such as micro-LED display, micro-OLED display, liquid crystal on silicon (LCOS) and a digital micro-mirror device (DMD), or a 3D image source such as a digital holographic display using a spatial light modulator (SLM) and laser light source. The display system may further contain relay optics if necessary.

In another embodiment, the size of the pinhole sized polarization volume lenses is between 0.3 mm to 5 mm. The distance is dependent on the lens power and pinhole size.

In still another embodiment, the number of the pinhole sized polarization volume lenses can be M (M≥1). In an embodiment, the number of the pinhole sized polarization volume lenses can be M (M≥2).

In still another embodiment, the reflection-type polarization volume lenses have a tunable working wavelength bandwidth.

In still another embodiment, the reflection-type polarization volume lenses have a birefringence between 0.02 and 0.4.

In still another embodiment, the reflection-type polarization volume lens can be electrically addressable if necessary.

In still another embodiment, the components in the first polarization modulator can be integrated or separate.

In various embodiments, the glasses-like AR optical display systems are disclosed. The first optical display system comprises: an image source, which generating the image light; an optical combiner, which is a reflection-type polarization volume lens (PVL). The reflection-type PVL works in the Bragg regime, and diffracts and images the light from the image source of the one polarization and transmits the image light of the other orthogonal polarization; or an optical combiner, which is an array of pinhole sized reflection-type PVLs. To further enrich the system, the second optical display system with polarization multiplexing comprises: an image source; an optical combiner, which is two reflection-type PVLs, or an optical combiner, which is two arrays of pinhole sized reflection-type PVLs; and a first polarization modulator to electronically control the polarization state. The third optical display system with polarization multiplexing comprises: an image source; an optical combiner, which is two overlapped reflection-type PVLs, or an optical combiner, which is two overlapped arrays of pinhole sized reflection-type PVLs; and a first polarization modulator. The fourth optical display system with polarization multiplexing comprises: an image source; an optical combiner, which is N overlapped reflection-type PVLs and active half-wave plates, or an optical combiner, which is N overlapped arrays of pinhole sized reflection-type PVLs; and a first polarization modulator.

In an optical display system such as a glasses-like AR optical display system, field of view (FOV) and depth of field (DOF) may have influence on the viewing feeling of a viewer who demands a high quality of viewing experiences. Here, we propose to exploit a reflection-type polarization volume lens (also referred to as reflective PVL), which is working in the Bragg regime, for such a kind of optical display system. This optical display system can be used in an AR display system.

A person skilled in the art would understand that a reflective PVL can be made to selectively work on a circularly polarized light with designed optical power, as reported in [K. Yin, Z. He, and S. T. Wu, "Reflective polarization volume lens with small f-number and large diffraction angle," Adv. Opt. Mater. 8, 2000170, 2020] Here, we apply this theory in the optical display system, especially, the glasses-like AR optical display system.

FIG. 1 shows a schematic diagram of an optical display system according to an embodiment. The optical display system comprises an image source 1, an optical combiner 2 with a substrate 3.

The image is presented by the image source 1. The image source can be to a conventional 2D display such as micro-LED display, micro-OLED display, liquid crystal on silicon (LCOS) and a digital micro-mirror device (DMD), or a 3D image source such as a digital holographic display using a spatial light modulator (SLM) and laser light source. The emitted light from the image source is delivered to the combiner and be imaged as a virtual image.

For example, the image source 1 is a micro-LED display. The displayed content is directly imaged by the optical combiner 2.

For example, the image source 1 is a liquid crystal on silicon (LCOS). The displayed content is firstly relayed as an intermediate image and then be imaged by the optical combiner 2.

The optical combiner 2 can be a single reflection-type polarization volume lens or an array of pinhole sized reflection-type polarization volume lenses. The optical combiner 2 is fabricated on the substrate 3. The reflection-type polarization volume lens based on the patterned cholesteric liquid crystal can diffract the light under off axis incidence while providing lens power to generate virtual image. Due to the polarization selectivity of the polarization volume lens, only left-handed circularly polarization or right-handed circularly polarization light will be imaged and delivered to viewer's eye. The other one will transmit without changing polarization state.

For example, the optical combiner is a single reflection-type polarization volume lens with left-handed circularly polarization response. The content from the image source 1 with left-handed circularly polarization is imaged as a virtual image by the optical combiner 2 and then be delivered to the eye of the viewer 4. The other light will be transmitted.

For example, the optical combiner is an array of reflection-type polarization volume lenses with left-handed circularly polarization response. The content from the image source 1 with left-handed circularly polarization is imaged as a virtual image by each pinhole sized polarization volume lens with dramatically increased depth of field. The depth of the field is depending on the size of each small lens. Then each virtual image will be delivered to the eye of the viewer 4 as a combined image. The other light will be transmitted.

Figure 2:
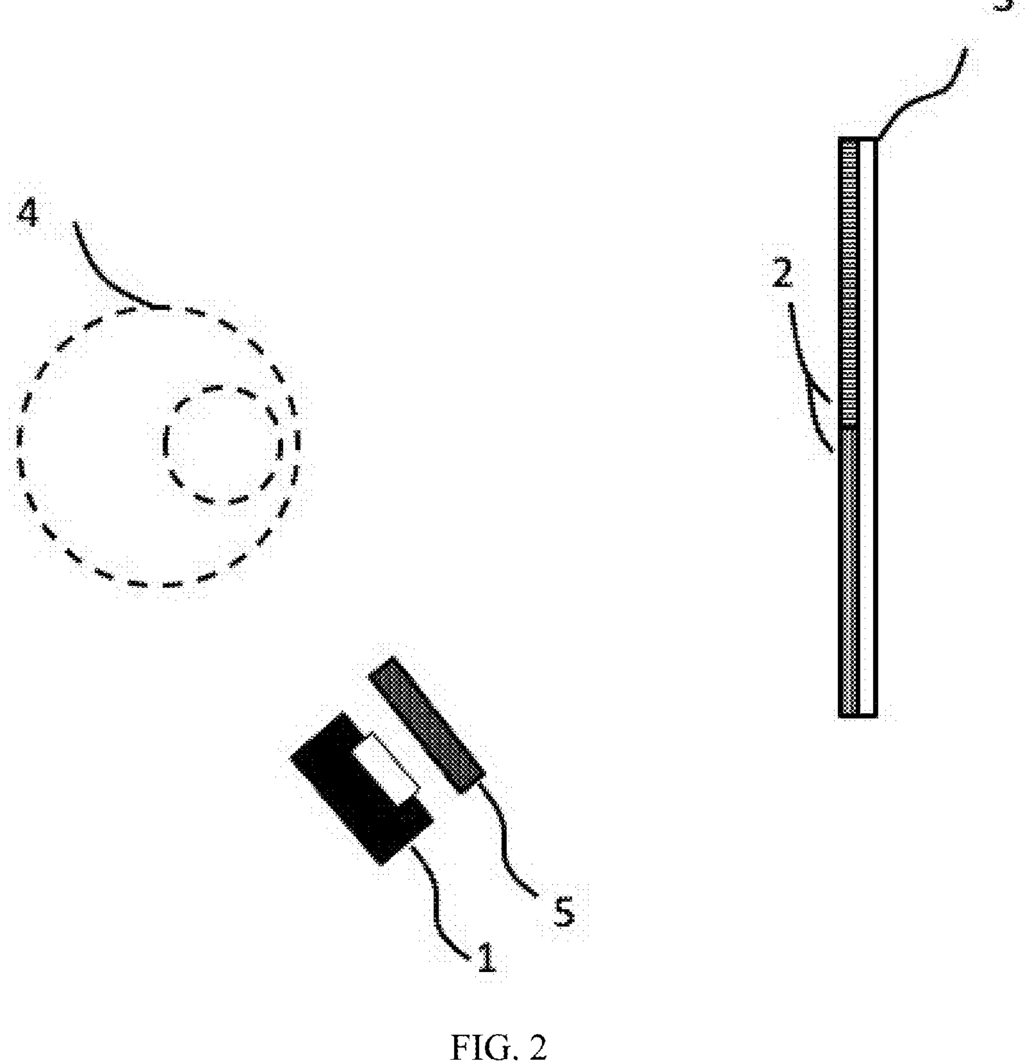
FIG. 2 is a schematic diagram of an optical display system with polarization multiplexing method based on a combiner consisting of two polarization volume lenses or two arrays of pinhole sized polarization volume lenses.

FIG. 2 shows a schematic diagram of a polarization multiplexing optical display system according to another embodiment. The optical display system comprises an image source 1, an optical combiner 2 with a substrate 3, and a first polarization modulator 5.

Same as the FIG. 1, the image is presented by the image source 1.

The optical combiner 2 can be two reflection-type polarization volume lenses with opposite polarization responses or two arrays of pinhole sized reflection-type polarization volume lenses with opposite polarization responses. Same as the FIG. 1, the optical combiner is fabricated on the substrate 3. The two/two arrays of reflection-type polarization volume lenses with opposite polarization responses have designed diffraction angles, incident angles and lens power.

For example, the optical combiner is two reflection-type polarization volume lenses. The content from the image source 1 with left-handed circularly polarization is imaged as a virtual image by one of the polarization volume lens. The content from the image source 1 with right-handed circularly polarization is imaged as a virtual image by the other the polarization volume lens. These two images are displayed with same depth and then are delivered to the eye of the viewer 4 as a combined image.

For example, the optical combiner are two arrays of reflection-type polarization volume lenses. The content from the image source 1 with left-handed circularly polarization is imaged as a virtual image by each lens of one array of pinhole sized polarization volume lenses with dramatically increased depth of field. The content from the image source 1 with right-handed circularly polarization is imaged as a virtual image by each lens of the other array of pinhole sized polarization volume lenses with dramatically increased depth of field. These two groups of images are displayed with same depth and then are delivered to the eye of the viewer 4 as a combined image.

The first polarization modulator 5 can be a combination of an electronically controlled twisted nematic (TN) or a vertical alignment (VA) cell and a quarter-wave plate. The TN or VA cell can change the polarization state of the image in time-domain or/and pixilation.

Figure 3:
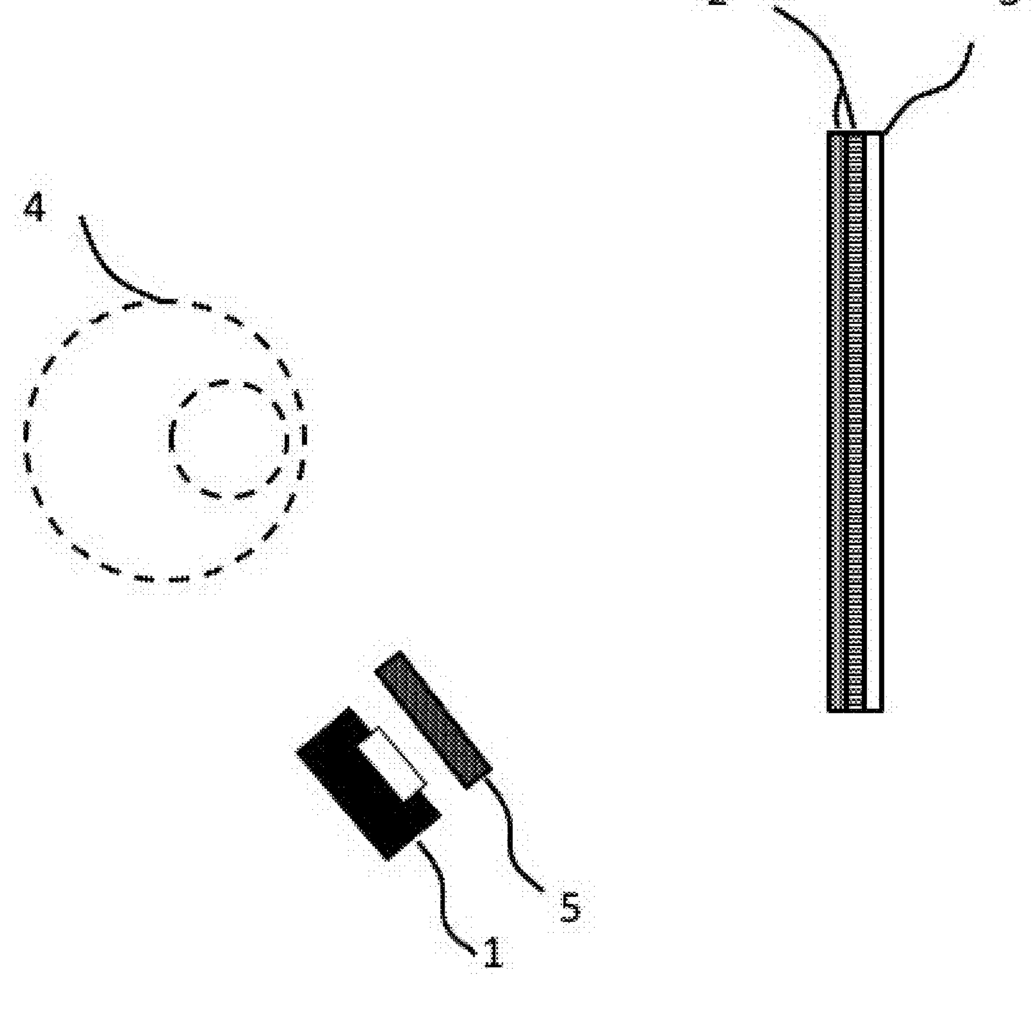
FIG. 3 is another schematic diagram of an optical display system with polarization multiplexing method based on a combiner consisting of two overlapped polarization volume lenses or two overlapped arrays of pinhole sized polarization volume lenses.

FIG. 3 shows a schematic diagram of a polarization multiplexing optical display system according to another embodiment. The optical display system comprises an image source 1, an optical combiner 2 with a substrate 3, and a first polarization modulator 5.

Same as the FIG. 1, the image is presented by the image source 1.

The optical combiner 2 can be two overlapped reflection-type polarization volume lenses with opposite polarization responses or two overlapped arrays of pinhole sized reflection-type polarization volume lenses with opposite polarization responses. Same as the FIG. 1, the optical combiner is fabricated on the substrate 3. The two/two arrays of reflection-type polarization volume lenses with opposite polarization responses have designed diffraction angles, incident angles and lens power.

For example, the optical combiner is two overlapped reflection-type polarization volume lenses. The content from the image source 1 with left-handed circularly polarization is imaged as a virtual image by one of the polarization volume lens. The content from the image source 1 with right-handed circularly polarization is imaged as a virtual image by the other the polarization volume lens. These two images are displayed with same depth and then are delivered to the eye of the viewer 4 as a combined image.

For example, the optical combiner are two overlapped arrays of reflection-type polarization volume lenses. The content from the image source 1 with left-handed circularly polarization is imaged as a virtual image by each lens of one array of pinhole sized polarization volume lenses with dramatically increased depth of field. The content from the image source 1 with right-handed circularly polarization is imaged as a virtual image by each lens of the other array of pinhole sized polarization volume lenses with dramatically increased depth of field. These two groups of images are displayed with same depth and then are delivered to the eye of the viewer 4 as a combined image.

The first polarization modulator 5 is the same as in FIG. 2.

Figure 4:
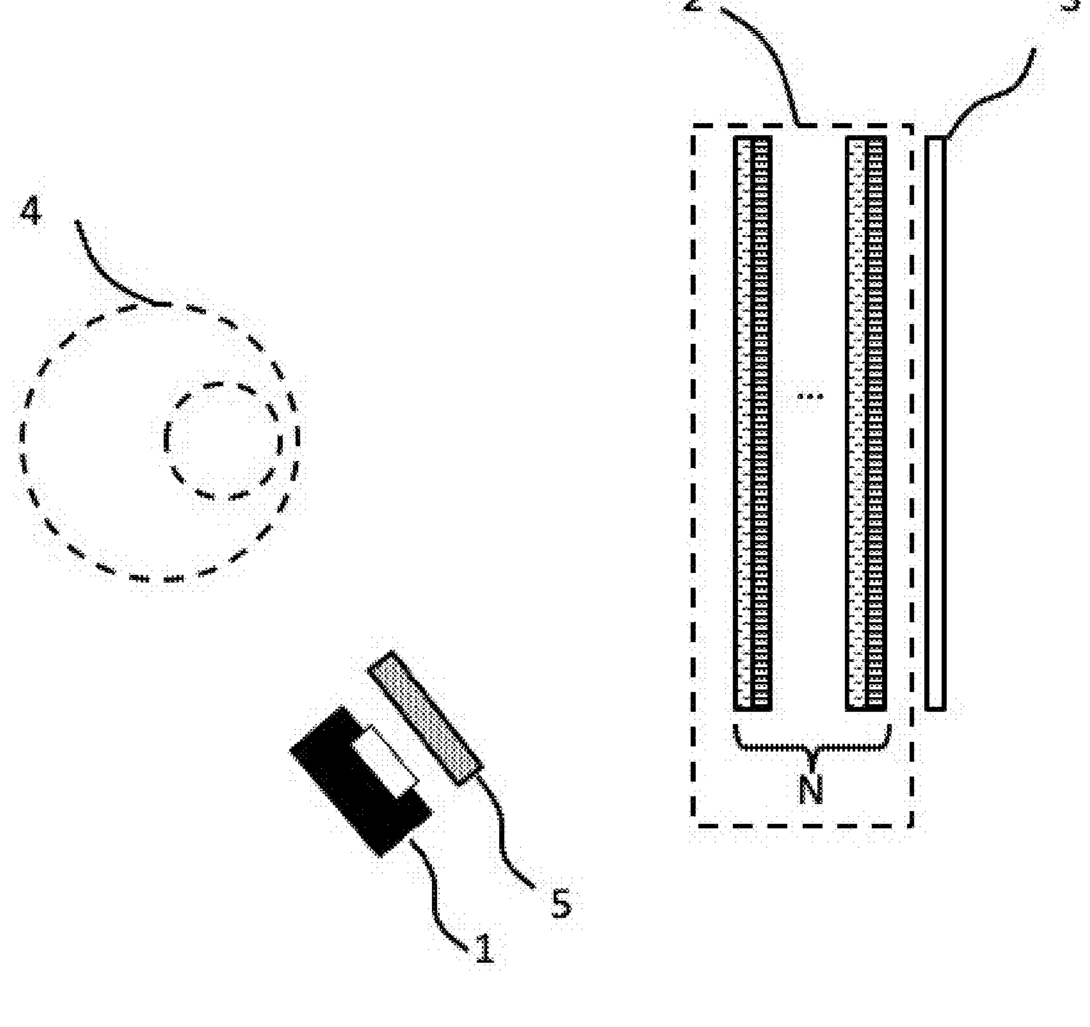
FIG. 4 is another schematic diagram of an optical display system with polarization multiplexing method based on a combiner consisting of N overlapped units. Each unit is composed of polarization volume lens and an active half-wave plate, or arrays of pinhole sized polarization volume lenses and active half-wave plates.

FIG. 4 shows a schematic diagram of a polarization multiplexing optical display system according to another embodiment. The optical display system comprises an image source 1, an optical combiner 2 with a substrate 3, and a first polarization modulator 5.

Same as the FIG. 1, the image is presented by the image source 1.

The optical combiner 2 can be a combination of N ($N \geq 1$) overlapped units. Each unit is composed of a reflection-type polarization volume lens and an active half-wave plate; or compose of arrays of pinhole sized reflection-type polarization volume lenses and active half-wave plates. Same as the FIG. 1, the optical combiner is fabricated on the substrate 3. The N/N arrays of reflection-type polarization volume lenses with same polarization responses have designed diffraction angles, incident angles and lens power. The N/N arrays of half-wave plates can be switched between on and off states.

For example, the optical combiner is N overlapped units. Each unit is composed of a reflection-type polarization volume lens and an active half-wave plate. The content from the image source 1 with right-handed circularly polarization is first converted to left-handed circularly polarized light by the first half-wave plate with on state. The left-handed circularly polarized content is imaged as a virtual image by the first polarization volume lens behind on-state half-wave plate. Then, a different content from the image source 1 with right-handed circularly polarization transmits the first unit (an off-state half-wave plate and a polarization volume lens) and encounters the second unit (an on-state half-wave plate and a polarization volume lens). The right-handed circularly polarized light is converted to left-handed circularly polarized light by the second half-wave plate. The left-handed circularly polarized content is imaged as a virtual image by the second polarization volume lens behind on-state half-wave plate. Then, the Nth different content from the image source 1 with right-handed circularly polarization transmits the ($N-1$) units (an off-state half-wave plate and a polarization volume lens) and encounters the Nth unit (an on-state half-wave plate and a polarization volume lens). The right-handed circularly polarized light is converted to left-handed circularly polarized light by the N half-wave plate. The left-handed circularly polarized content is imaged as a virtual image by the N polarization volume lens behind on-state half-wave plate. These N images are displayed with same depth and then are delivered to the eye of the viewer 4 as a combined image.

For example, the optical combiner is N overlapped units. Each unit is composed of arrays of reflection-type polarization volume lenses and an active half-wave plates. The content from the image source 1 with right-handed circularly polarization is first converted to left-handed circularly polarized light by the first half-wave plate array with on state. The left-handed circularly polarized content is imaged as a virtual image by the first polarization volume lenses array behind on-state half-wave plates array. Then, a different content from the image source 1 with right-handed circularly polarization transmits the first unit (an off-state half-wave plate array and a polarization volume lenses array) and encounters the second unit (an on-state half-wave plate array and a polarization volume lenses array). The right-handed circularly polarized light is converted to left-handed circularly polarized light by the second half-wave plates array. The left-handed circularly polarized content is imaged as a virtual image by the second polarization volume lenses array behind on-state half-wave plates array. Then, the Nth different content from the image source 1 with right-handed circularly polarization transmits the (N−1) units (an off-state half-wave plate array and a polarization volume lenses array) and encounters the Nth unit (an on-state half-wave plate array and a polarization volume lenses array). The right-handed circularly polarized light is converted to left-handed circularly polarized light by the N half-wave plate array. The left-handed circularly polarized content is imaged as a virtual image by the N polarization volume lenses array behind on-state half-wave plates array. These N images are displayed with same depth and then are delivered to the eye of the viewer 4 as a combined image.

The first polarization modulator 5 can be simplified to a quarter-wave plate to provide circularly polarized light.

Figure 5A:
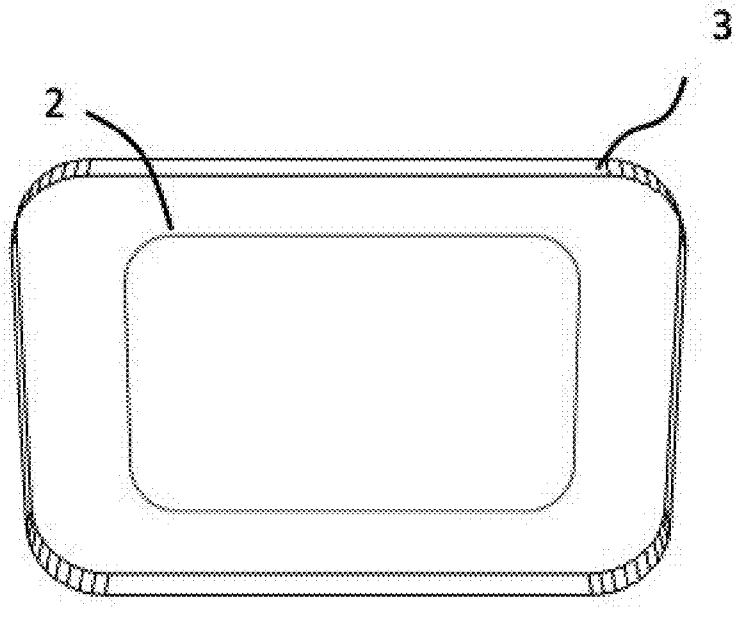
FIG. 5A is a schematic diagram of combiner with a polarization volume lens.

FIG. 5A shows one configuration of the optical combiner 2 with substrate 3 in FIG. 1. The optical combiner 2 is a reflective-type polarization volume lens with left or right handed circularly polarized response. The thickness of the optical combiner is between 0.1 and 20 micrometers. The substrate 3 can be and not limited to glass or plastic.

Figure 5B:
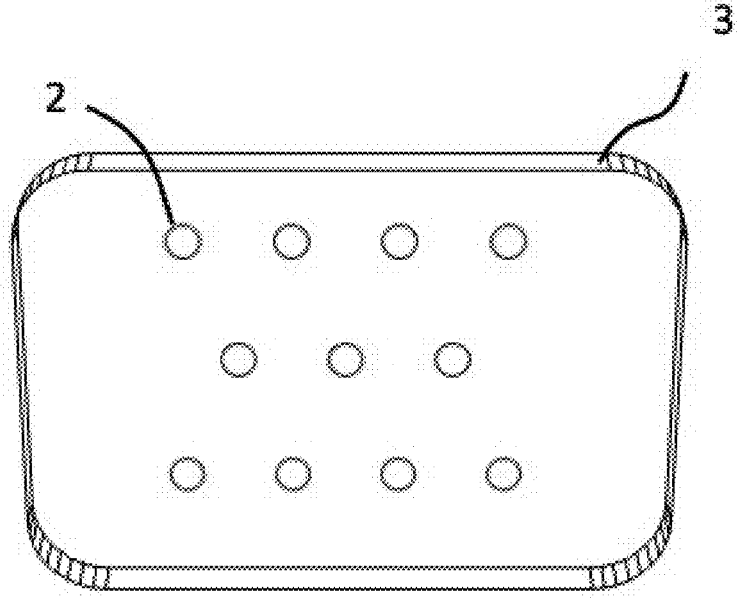
FIG. 5B is a schematic diagram of combiner with an array of pinhole sized polarization volume lenses.

FIG. 5B shows another configuration of the optical combiner 2 with substrate 3 in FIG. 1. The optical combiner 2 is an array of reflective-type polarization volume lenses with left or right handed circularly polarized response. The thickness of the optical combiner is between 0.1 and 20 micrometers. The size of each pinhole lens is between 0.3 and 5 mm. The distance between each small lens is dependent on the size of each pinhole and the lens power. The number of the pinhole sized polarization volume lenses can be M (M≥1). The substrate 3 can be and not limited to glass or plastic.

Figure 6A:
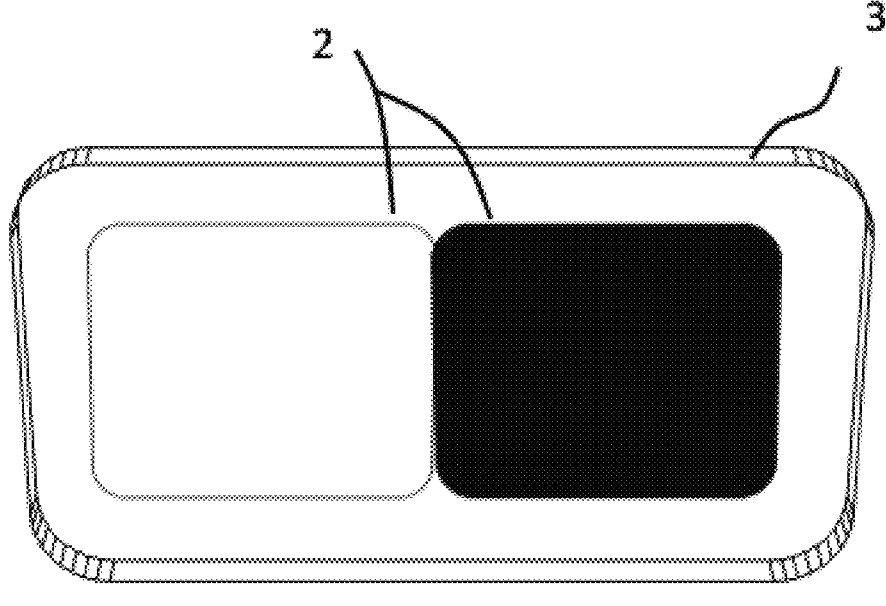
FIG. 6A is a schematic diagram of combiner with two polarization volume lenses.

FIG. 6A shows one configuration of the optical combiner 2 with substrate 3 in FIG. 2. The optical combiner 2 is two reflective-type polarization volume lenses with left and right handed circularly polarized responses respectively. The thickness of the optical combiner is between 0.1 and 20 micrometers. The substrate 3 can be and not limited to glass or plastic.

Figure 6B:
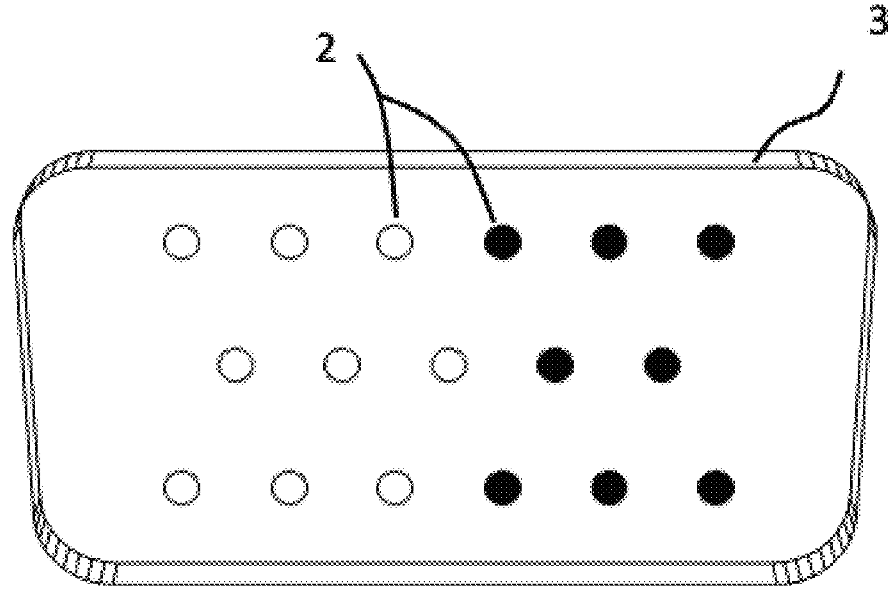
FIG. 6B is a schematic diagram of combiner with two arrays of pinhole sized polarization volume lenses.

FIG. 6B shows another configuration of the optical combiner 2 with substrate 3 in FIG. 2. The optical combiner 2 is two arrays of reflective-type polarization volume lenses with left and right handed circularly polarized responses respectively. The thickness of the optical combiner is between 0.1 and 20 micrometers. The size of each pinhole lens is between 0.3 and 5 mm. The distance between each small lens is dependent on the size of each pinhole and the lens power. The number of the pinhole sized polarization volume lenses can be M (M≥2). The substrate 3 can be and not limited to glass or plastic.

Figure 7A:
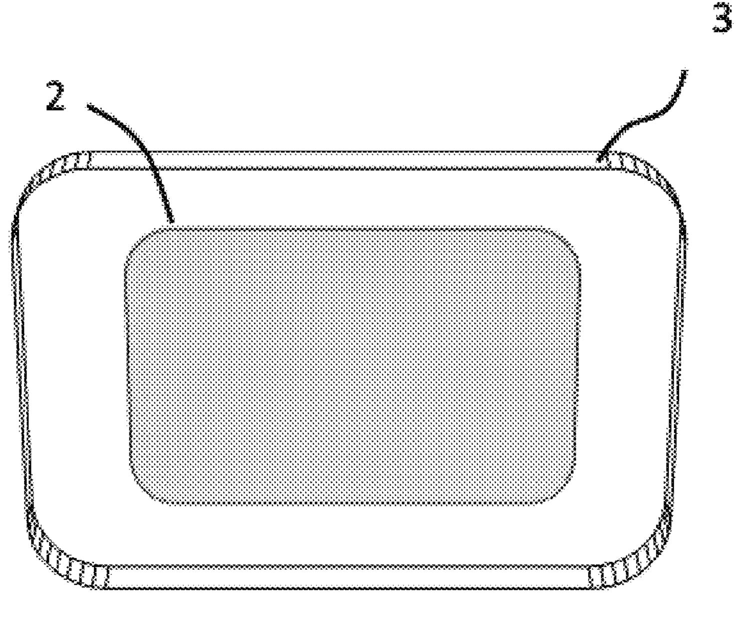
FIG. 7A is a schematic diagram of combiner with two overlapped polarization volume lenses.

FIG. 7A shows one configuration of the optical combiner 2 with substrate 3 in FIG. 3. The optical combiner 2 is two overlapped reflective-type polarization volume lenses with left and right handed circularly polarized responses respectively. The thickness of the optical combiner is between 0.2 and 40 micrometers. The substrate 3 can be and not limited to glass or plastic.

Figure 7B:
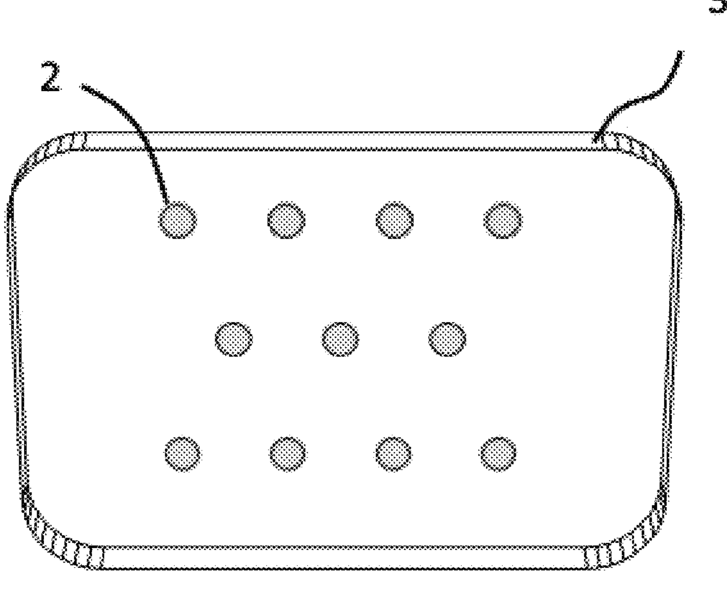
FIG. 7B is a schematic diagram of combiner with two overlapped arrays of pinhole sized polarization volume lenses.

FIG. 7B shows another configuration of the optical combiner 2 with substrate 3 in FIG. 3. The optical combiner 2 is two overlapped arrays of reflective-type polarization volume lenses with left and right handed circularly polarized responses respectively. The thickness of the optical combiner is between 0.2 and 40 micrometers. The size of each pinhole lens is between 0.3 mm to 5 mm. The distance between each small lens is dependent on the size of each pinhole and the lens power. The number of the pinhole sized polarization volume lenses can be M (M≥2). The substrate 3 can be and not limited to glass or plastic.

Figure 8A:
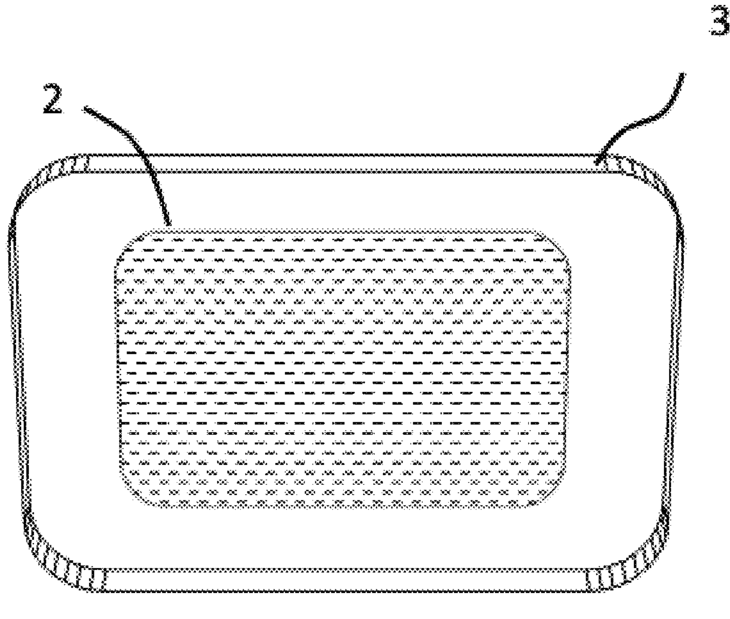
FIG. 8A is a schematic diagram of combiner with N overlapped units. Each unit is composed of a polarization volume lens and an active half-wave plate.

FIG. 8A shows one configuration of the optical combiner 2 with substrate 3 in FIG. 4. The optical combiner 2 is N overlapped units. Each unit is composed of a reflective-type polarization volume lens and an active half-wave plate. The polarization response of each polarization volume lens is the same. All the active half-wave plates can be switched between on and off states. The substrate 3 can be and not limited to glass or plastic.

Figure 8B:
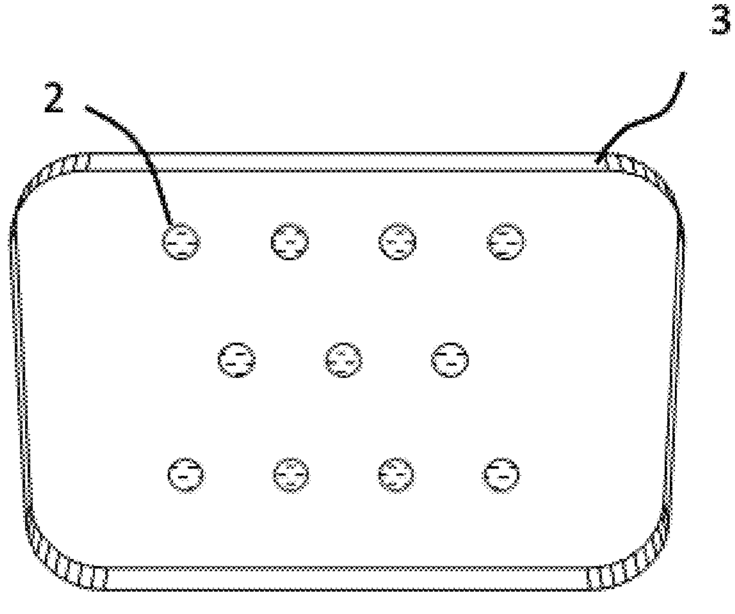
FIG. 8B is a schematic diagram of combiner with N overlapped units. Each units is composed of arrays of pinhole sized polarization volume lenses and active half-wave plates.

FIG. 8B shows another configuration of the optical combiner 2 with substrate 3 in FIG. 4. The optical combiner 2 is N overlapped units. Each unit is composed of arrays of reflective-type polarization volume lenses and active half-wave plates. The size of each pinhole lens is between 0.3 mm to 5 mm. The distance between each small lens is dependent on the size of each pinhole and the lens power. The number of the pinhole sized polarization volume lenses can be M (M≥2). The polarization response of each unit is the same. All the active half-wave plates can be switched between on and off states. The substrate 3 can be and not limited to glass or plastic.

Figure 9A:
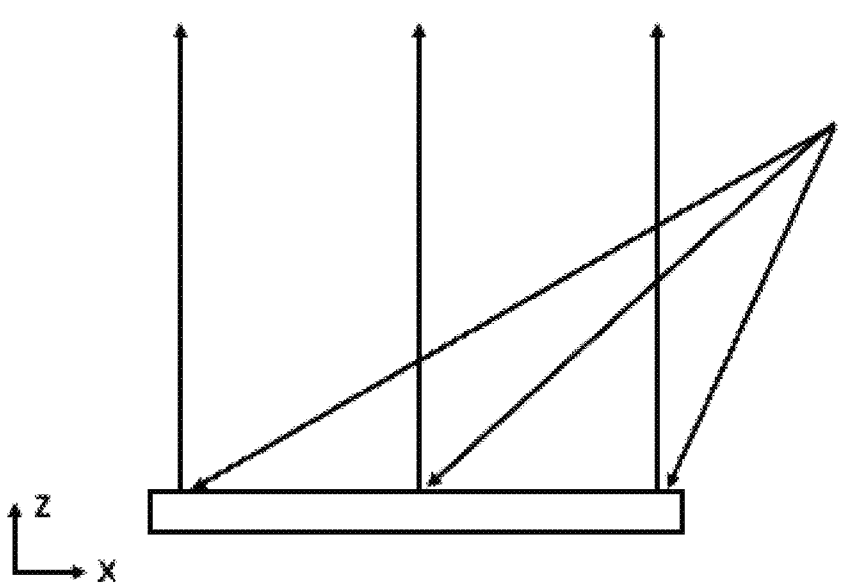
FIG. 9A is a schematic cross-section view of a reflection-type polarization volume lens according to an embodiment.

FIG. 9A is a schematic cross-sectional view of a reflection-type polarization volume lens with off axis incidence.

Figure 9B:
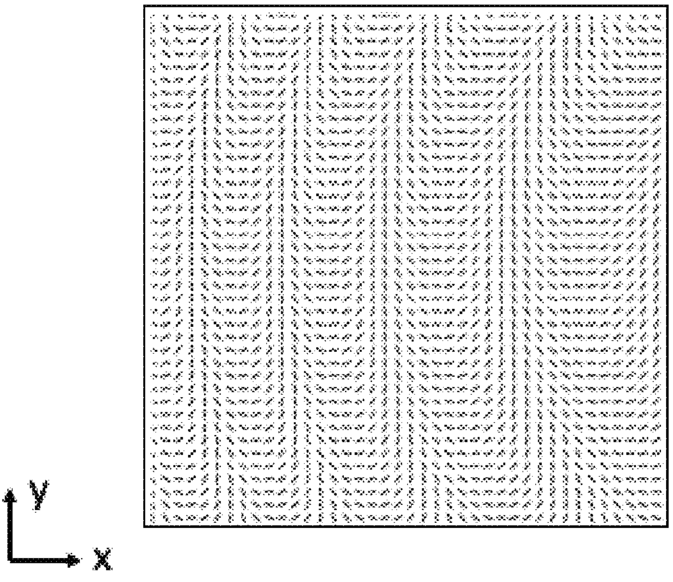
FIG. 9B is a schematic top view of a reflection-type polarization volume lens structure with surface alignment according to another embodiment.

FIG. 9B depicts the liquid crystal anisotropy axis orientation distribution of the reflection-type polarization volume lens. The reflection-type polarization volume lens has patterned cholesteric liquid crystals (CLC).

For a reflection-type polarization volume lens, due to its polarization selectivity, it can reflect an image light of one circular polarization and transmit the image light of the other polarization. For example, the left-handed circularly polarized image light will be diffracted and imaged by the left-handed reflection-type polarization volume lens, while the left-handed circularly polarized component will pass through the reflection-type polarization volume lens. Similarly, the left-handed circularly polarized image light will be reflected by the left-handed reflection-type polarization volume lens, while the right-handed circularly polarized component will pass through without being affected.

Here, the reflection-type polarization volume lens may have a tunable working wavelength bandwidth. The bandwidth (e.g., from 20 nm to 100 nm) is mainly determined by the birefringence of liquid crystal. The birefringence is between 0.02 and 0.4. The reflection-type polarization volume lens is electrically addressable. The optical combiner 2 can be a stack of several layers of polarization volume lenses with different working wavelengths.

Figure 10:
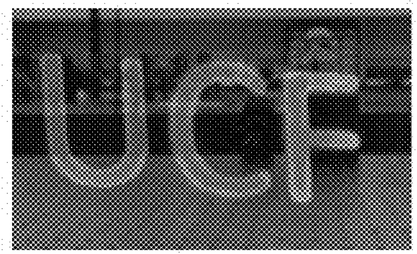
FIG. 10 is the experimental data of the proposed system based on the configuration described in FIG. 3.
Figure 10:
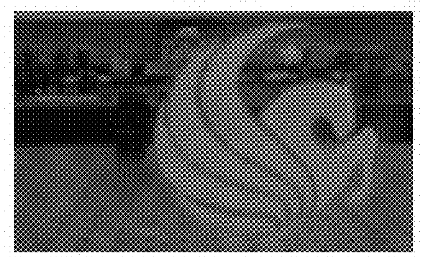
Figure 10:
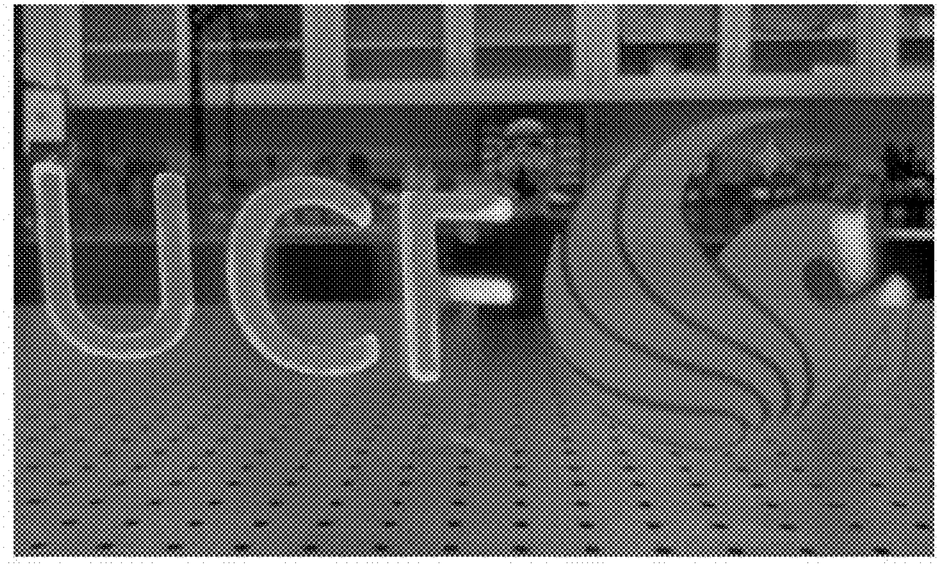

FIG. 10 is the experimental data of the proposed system based on the configuration described in FIG. 3. As shown in FIG. 10, by using the optical display system herein, two CG picture could be combined into the actual environment.

Figure 11:
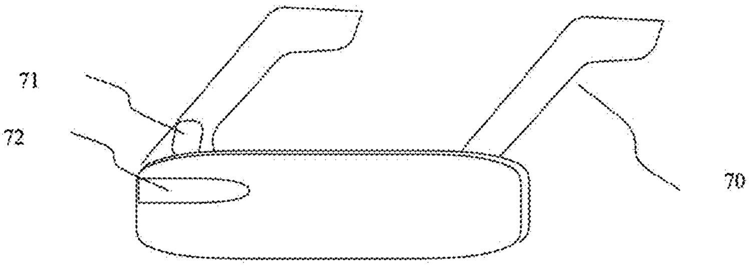
FIG. 11 is a schematic diagram of an electronics apparatus according to an embodiment.

FIG. 11 is a schematic diagram of an electronics apparatus according to an embodiment. As shown in FIG. 11, the electronics apparatus 70 may include the optical display system as describe above. The optical display system may include an image source 71 and an optical combiner 72. For example, the electronics apparatus 70 is an VR glasses. For example, the optical combiner 72 is placed in the waveguide of the VR glasses.

In a first aspect, there is provided an optical display system, comprising:

an image source, which generating image light;

an optical combiner, which is a reflection-type polarization volume lens, wherein the reflection-type polarization volume lens works in the Bragg regime, and diffracts and images the contents from the image source of the one polarization and transmits the image light of the other orthogonal polarization;

or an optical combiner, which is an array of pinhole sized reflection-type polarization volume lenses, wherein the reflection-type polarization volume lenses work in the Bragg regime, and diffract and image the contents from the image source of the one polarization and transmits the image light of the other orthogonal polarization.

In a second aspect, there is provided a polarization multiplexing optical display system, comprising:

an image source, which generating image light;

an optical combiner, which is two reflection-type polarization volume lenses, wherein the two reflection-type polarization volume lenses work in the Bragg regime, and diffract and image the contents from the image source with two orthogonal polarizations respectively;

or an optical combiner, which is two arrays of pinhole sized reflection-type polarization volume lenses, wherein the two arrays of reflection-type polarization volume lenses work in the Bragg regime, and diffract and image the contents from the image source with two orthogonal polarizations respectively;

a first polarization modulator, which is a combination of an electronically controlled twisted nematic (TN) or a vertical alignment (VA) cell and a quarter-wave plate, wherein the TN or VA cell can change the polarization state of the image in time-domain or/and pixilation.

In a third aspect, there is provided a polarization multiplexing optical display system, comprising:

an image source, which generating image light;

an optical combiner, which is two overlapped reflection-type polarization volume lenses, wherein the two overlapped reflection-type polarization volume lenses work in the Bragg regime, and diffract and image the contents from the image source with two orthogonal polarizations respectively;

or an optical combiner, which is two overlapped arrays of pinhole sized reflection-type polarization volume lenses, wherein the two overlapped arrays of reflection-type polarization volume lenses work in the Bragg regime, and diffract and image the contents from the image source with two orthogonal polarizations respectively;

a first polarization modulator, same as that in the second aspect.

In a fourth aspect, there is provided a polarization multiplexing optical display system, comprising:

an image source, which generating image light;

an optical combiner, which is N overlapped units, wherein each unit is composed of a reflection-type polarization volume lens and an active half-wave plate, the N overlapped reflection-type polarization volume lenses work in the Bragg regime, and diffract and image the contents from the image source, all the active half-wave plate can be switched between on and off states;

or an optical combiner, N overlapped units, wherein each unit is composed of arrays of pinhole sized reflection-type polarization volume lenses and active half-wave plates, the N overlapped reflection-type polarization volume lenses work in the Bragg regime, and diffract and image the contents from the image source, all the active half-wave plate can be switched between on and off states;

a first polarization modulator, which is a quarter-wave plate.

In an embodiment, the type can be a conventional 2D display such as micro-LED display, micro-OLED display, liquid crystal on silicon (LCOS) and a digital micro-minor device (DMD), or a 3D image source such as a digital holographic display using a spatial light modulator (SLM) and laser light source.

In an embodiment, the image source contains relay optics if necessary.

In an embodiment, in the optical combiner, the size of the pinhole sized polarization volume lenses is between 0.3 mm to 5 mm. The distance is dependent on the lens power and pinhole size.

In an embodiment, in the optical combiner, the number of the pinhole sized polarization volume lenses can be M ($M \geq 1$).

In an embodiment, in the optical combiner, the number of the pinhole sized polarization volume lenses can be M ($M \geq 2$).

In an embodiment, the reflection-type polarization volume lenses have a tunable working wavelength bandwidth.

In an embodiment, the reflection-type polarization volume lenses have a birefringence between 0.02 and 0.4.

In an embodiment, the reflection-type polarization volume lens can be electrically addressable if necessary.

In an embodiment, the components in the first polarization modulator can be integrated or separate.

In a fifth aspect, there is provided an optical display system, comprising:

an image source, which generates image light; and a reflection-type lens unit, which includes at least one reflection-type volume lens, wherein the image light is incident onto the reflection-type lens unit and at least one part of the image light is diffracted by the reflection-type lens unit to an exit pupil of the optical display system.

In an embodiment, the reflection-type lens unit is transparent.

In an embodiment, the at least one reflection-type volume lens includes a reflection-type polarization volume lens.

In an embodiment, the reflection-type lens unit is an optical combiner.

In an embodiment, the reflection-type lens unit is formed on a substrate.

In an embodiment, the substrate is transparent.

In an embodiment, the at least one reflection-type volume lens is reflection-type polarization volume lens.

In an embodiment, the at least one reflection-type volume lens works in the Bragg regime.

In an embodiment, the at least one reflection-type volume lens diffracts the image light of a first polarization to image the contents from the image source.

In an embodiment, the at least one reflection-type volume lens transmits the image light of a second polarization.

In an embodiment, the first polarization is orthogonal to the second polarization.

In an embodiment, the at least one reflection-type volume lens includes an array of pinhole sized reflection-type volume lenses.

In an embodiment, the pinhole sized reflection-type volume lenses are pinhole sized reflection-type polarization volume lenses.

In an embodiment, the pinhole sized reflection-type volume lenses work in the Bragg regime.

In an embodiment, the pinhole sized reflection-type volume lenses diffract the image light of a first polarization to image the contents from the image source.

In an embodiment, the pinhole sized reflection-type volume lenses transmit the image light of a second polarization.

In an embodiment, the first polarization is orthogonal to the second polarization.

In an embodiment, the reflection-type lens unit includes two reflection-type polarization volume lenses.

In an embodiment, the two reflection-type polarization volume lenses are placed in a same plane.

In an embodiment, the two reflection-type polarization volume lenses work in the Bragg regime.

In an embodiment, the two reflection-type polarization volume lenses diffract image lights of two orthogonal polarizations, respectively, to image the contents from the image source.

In an embodiment, the contents from the image source are imaged into 3D images.

In an embodiment, the reflection-type lens unit includes two arrays of pinhole sized reflection-type polarization volume lenses.

In an embodiment, the two arrays of pinhole sized reflection-type polarization volume lenses are placed in a same plane.

In an embodiment, the two arrays of pinhole sized reflection-type polarization volume lenses work in the Bragg regime.

In an embodiment, the two arrays of pinhole sized reflection-type polarization volume lenses diffract image lights of two orthogonal polarizations, respectively, to image the contents from the image source.

In an embodiment, the contents from the image source can be imaged into 3D images.

In an embodiment, the optical display system further comprises: a first polarization modulator, placed between the image source and the reflection-type lens unit.

In an embodiment, the first polarization modulator changes the polarization state of the image light to be suitable for being diffracted by the reflection-type lens unit.

In an embodiment, the first polarization modulator changes the polarization state of the image light in time-domain or/and pixilation.

In an embodiment, the first polarization modulator is a combination of an electronically controlled twisted nematic (TN) or a vertical alignment (VA) cell and a quarter-wave plate.

In an embodiment, the TN or VA cell can change the polarization state of the image light in time-domain or/and pixilation.

In an embodiment, the two reflection-type polarization volume lenses are overlapped.

In an embodiment, the two arrays of pinhole sized reflection-type polarization volume lenses are overlapped.

In an embodiment, the image source includes a 2D display or a 3D image source.

In an embodiment, the 2D display includes micro-LED display, micro-OLED display, liquid crystal on silicon (LCOS) and a digital micro-mirror device (DMD).

In an embodiment, the 3D image source includes a digital holographic display using a spatial light modulator (SLM) and laser light source.

In an embodiment, the image source includes relay optics.

In an embodiment, the size of each pinhole sized polarization volume lens of the pinhole sized polarization volume lenses is between 0.3 mm to 5 mm.

In an embodiment, the distance between two pinhole sized polarization volume lenses is dependent on the lens power and pinhole size.

In an embodiment, the number of the pinhole sized polarization volume lenses can be M ($M \geq 1$).

In an embodiment, the number of the pinhole sized polarization volume lenses can be M ($M \geq 2$).

In an embodiment, the reflection-type volume lens has a tunable working wavelength bandwidth.

In an embodiment, the reflection-type volume lens has a birefringence between 0.02 and 0.4.

In an embodiment, the reflection-type volume lens is electrically addressable.

In an embodiment, components in the first polarization modulator are integrated or separate.

In an embodiment, the first polarization is left-handed circularly polarization or right-handed circularly polarization, and the second polarization is right-handed circularly polarization or left-handed circularly polarization.

In an embodiment, the reflection-type lens unit includes at least two reflection-type volume lenses.

In an embodiment, the at least two reflection-type volume lenses diffract the image light with one polarization.

In an embodiment, the at least two reflection-type volume lenses diffract the image light under different off axis incidences to generate at least two virtual images and combine them together.

In an embodiment, the reflection-type lens unit includes at least two second polarization modulators corresponding to the reflection-type volume lenses.

In an embodiment, the second polarization modulators provide the image light with said one polarization for the corresponding reflection-type volume lenses, respectively.

In an embodiment, the second polarization modulators are controlled by corresponding switches to provide the image light with said one polarization for the corresponding reflection-type volume lenses, respectively.

In an embodiment, the second polarization modulators are active half-wave plates.

In an embodiment, the second polarization modulators are switched in time domain to generate and combine images.

In a sixth aspect, there is provided an electronics apparatus, including the optical display system as described above.

In an embodiment, the electronics apparatus is an augmented reality (AR) device.

Although some specific embodiments of the present invention have been demonstrated in detail with examples, it should be understood by a person skilled in the art that the above examples are only intended to be illustrative but not to limit the scope of the present invention.

What is claimed is:

1. An optical display system, comprising:

an image source, which generates image light; and an optical combiner, which includes two reflection-type polarization volume lenses or arrays of polarization volume lenses working in a Bragg regime, wherein the reflection-type polarization volume lenses are pinhole sized polarization volume lenses, wherein a first reflection-type polarization volume lens of the two reflection-type polarization volume lenses or arrays of polarization volume lenses reflectively diffracts the image light of a first circular polarization to a first image and transmits the image light of a second circular polarization, and a second reflection-type polarization volume lens of the two reflection-type polarization volume lenses or arrays of polarization volume lenses reflectively diffracts the image light of a third circular polarization to a second image and transmits the image light of a fourth circular polarization, and the optical combiner outputs the first image and/or the second image as an combined image.

2. The optical display system according to claim 1, wherein the first circular polarization is orthogonal to the second circular polarization and is the same as or orthogonal to the third polarization, and the third circular polarization is orthogonal to the fourth circular polarization.

3. The optical display system according to claim 1, further comprising:

a first polarization modulator, placed between the image source and the optical combiner, wherein the first polarization modulator changes polarization states of the image light to be circular polarization and suitable for being diffracted by the first reflection-type polarization volume lens and the second reflection-type polarization volume lens, respectively, to form the first image and the second image.

4. The optical display system according to claim 3, wherein the first polarization modulator further comprises an electronically controlled twisted nematic (TN) or a vertical alignment (VA) cell, and changes the polarization states in time-domain or/and pixilation.

5. The optical display system according to claim 1, wherein the optical combiner includes N overlapped units, where N≥2, each of the N overlapped units includes an active half-wave plate and a reflection-type polarization volume lens or arrays of polarization volume lenses, wherein the active half-wave plate in each unit is adapted to be switched between on and off states to make corresponding reflection-type polarization volume lens or arrays of polarization volume lenses diffract the image light of corresponding polarization to a respective image;

wherein the respective images diffracted by the reflection-type polarization volume lenses or arrays of polarization volume lenses of the N overlapped units are displayed with same depth and combined into the combined image; and wherein the reflection-type polarization volume lenses or arrays of polarization volume lenses of the N overlapped units include a first unit of the two overlapped units includes said first reflection-type polarization volume lens and said second reflection-type polarization volume lens.

6. The optical display system according to claim 1, wherein the optical display system comprises a substrate, and the first reflection-type polarization volume lens and the second reflection-type polarization volume lens of the optical combiner are placed on the substrate and in the same plane, the first reflection-type polarization volume lens and the second reflection-type polarization volume lens are configured to receive the image light from the image source, diffract the image light with different polarization states in parallel, and generate a first virtual image and a second virtual image displayed with same depth.

7. The optical display system according to claim 1, wherein the image light is off axis incident light.

8. The optical display system according to claim 1, wherein the first image and the second image have different incident angles and/or different diffraction angles and/or different lens powers to follow a movement of a viewer's eye.

9. An electronics apparatus, including the optical display system according to claim 1.

* * * * *